(12) United States Patent
Lim et al.

(10) Patent No.: US 10,139,928 B2
(45) Date of Patent: Nov. 27, 2018

(54) ELECTRONIC PEN SENSING PANEL, ELECTRONIC PEN SENSING DEVICE, AND DISPLAY DEVICE INCLUDING THE SAME

(71) Applicant: Samsung Display Co., Ltd., Yongin-si (KR)

(72) Inventors: Sang-Hyun Lim, Cheonan-si (KR); Chang-Sub Jung, Hwaseong-si (KR); A-Ra Jo, Seoul (KR); Jae-Woo Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 12 days.

(21) Appl. No.: 15/392,841

(22) Filed: Dec. 28, 2016

(65) Prior Publication Data

US 2017/0205907 A1   Jul. 20, 2017

(30) Foreign Application Priority Data

Jan. 19, 2016   (KR) ........................ 10-2016-0006349

(51) Int. Cl.
*G06F 3/0354* (2013.01)
*G06F 3/041* (2006.01)
*G06F 3/044* (2006.01)
*G06F 3/046* (2006.01)

(52) U.S. Cl.
CPC .......... *G06F 3/03545* (2013.01); *G06F 3/044* (2013.01); *G06F 3/046* (2013.01); *G06F 3/0416* (2013.01)

(58) Field of Classification Search
CPC ............................ G06F 3/03545; G06F 3/046
USPC ................. 178/18.07, 19.06–19.07; 345/179
See application file for complete search history.

(56) References Cited

U.S. PATENT DOCUMENTS

| 4,423,286 | A | * | 12/1983 | Bergeron | ................ G06F 3/046 178/18.07 |
|---|---|---|---|---|---|
| 7,875,814 | B2 | | 1/2011 | Chen et al. | |
| 2010/0238121 | A1 | | 9/2010 | Ely | |

(Continued)

FOREIGN PATENT DOCUMENTS

EP   1746488   1/2007
KR   10-2007-0012276   1/2007

(Continued)

OTHER PUBLICATIONS

The Extended European Search Report dated May 17, 2017, issued in European Patent Application No. 17151780.8.

*Primary Examiner* — Michael Pervan
(74) *Attorney, Agent, or Firm* — H.C. Park & Associates, PLC

(57) ABSTRACT

An electronic pen sensing device includes: a substrate including a sensing region and a first sub sensing region, the first sub sensing region having a width smaller than a width of the sensing region; a first closed loop line disposed along edges of the sensing region and wound N times in a first rotation direction from a first node to a second node, and disposed along edges of the first sub sensing region and wound M times in a first rotation direction from the second node to the first node; and a controller configured to calculate a location of an electronic pen based on a first induction current which is output through the first node, wherein N and M are positive integers.

21 Claims, 10 Drawing Sheets

(56) References Cited

U.S. PATENT DOCUMENTS

2015/0009623 A1\* 1/2015 Ryu .................... G06F 3/046
                                                    361/679.55
2016/0179134 A1   6/2016 Ryu

FOREIGN PATENT DOCUMENTS

KR    10-2013-0052155    5/2013
WO       2013/070027     5/2013

\* cited by examiner

ELECTRONIC PEN SENSING PANEL, ELECTRONIC PEN SENSING DEVICE, AND DISPLAY DEVICE INCLUDING THE SAME

CROSS-REFERENCE TO RELATED APPLICATION

This application claims priority from and the benefit of Korean Patent Application No. 10-2016-0006349, filed on Jan. 19, 2016, which is hereby incorporated by reference for all purposes as if fully set forth herein.

BACKGROUND

Field

Exemplary embodiments relate to a display device. More particularly, exemplary embodiments relate to an electronic pen sensing panel employing an electromagnetic induction technique, an electronic pen sensing device, and a display device including an electronic pen sensing device.

Discussion of the Background

An electromagnetic induction technique generates a magnetic field by providing a current to a first coil and generates an induced electromotive force (or an induction current) based on the magnetic field using a second coil. The electromagnetic induction technique is used for wireless charging devices, digitizers, etc.

A conventional digitizer includes a tablet and an electronic pen. The tablet typically has a shape of a plate (or the tablet is a plate-like), the tablet includes a first coil disposed on an edge of the tablet, and the tablet generates a first magnetic field using the first coil. The electronic pen stores an induced electromotive force which is generated based on the first magnetic field, and the electronic pen generates a second magnetic field based on the induced electromotive force. The digitizer may then sense a position of the electronic pen based on the second magnetic field.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an electronic pen sensing device.

Exemplary embodiments provide a display device including the electronic pen sensing device.

Additional aspects will be set forth in the detailed description which follows, and, in part, will be apparent from the disclosure, or may be learned by practice of the inventive concept.

According to an exemplary embodiment, an electronic pen sensing device includes: electronic pen sensing device including: a substrate including a sensing region and a first sub sensing region, the first sub sensing region having a width smaller than a width of the sensing region; a first closed loop line disposed along edges of the sensing region and wound N times in a first rotation direction from a first node to a second node, and disposed along edges of the first sub sensing region and wound M times in the first rotation direction from the second node to the first node; and a controller configured to calculate a location of an electronic pen based on a first induction current which is output through the first node, wherein N and M are positive integers.

According to an exemplary embodiment, an electronic pen sensing device includes: a substrate including a sensing region and sensing block regions which are generated by dividing the sensing region; a main pattern disposed on an edge of the sensing region from a first node to a second node along a first rotation direction; a first block pattern disposed overlapping an edge of a first sensing block region among the sensing block regions from the second node to the first node along the first rotation direction; a second block pattern disposed overlapping an edge of a second sensing block region among the sensing block regions from the second node to the first node along the first rotation direction; and a controller configured to electrically connect one of the first block pattern and the second block pattern between the first node and the second node and to calculate a location of an electronic pen based on a first induction current which is output through the first node.

According to an exemplary embodiment, a display device includes an electronic pen configured to generate an electromagnetic force; and an electronic pen sensing device configured to generate an induction current based on the electromagnetic force and sense the electronic pen based on the induction current, wherein the electronic pen sensing device includes: a substrate including a sensing region and a first sub sensing region, the first sub sensing region having a width smaller than a width of the sensing region; a first closed loop line disposed along edges of the sensing region and wound N times in a first rotation direction from a first node to a second node, and disposed along edges of the first sub sensing region and wound M times in the first rotation direction from the second node to the first node; and a controller configured to calculate a location of an electronic pen based on the induction current which is output through the first node, wherein N and M are positive integers.

According to an exemplary embodiment, an electronic pen sensing panel includes a substrate comprising a sensing region and a first sub sensing region, the first sub sensing region having a width smaller than a width of the sensing region; a first closed loop line disposed along edges of the sensing region and wound N times in a first rotation direction from a first node to a second node, and disposed along edges of the first sub sensing region and wound M times in a first rotation direction from the second node to the first node on the substrate; and an output terminal configured to output a first induction current which is induced by the first closed loop line, the output terminal being electrically connected to the first node, wherein N and M are positive integers.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
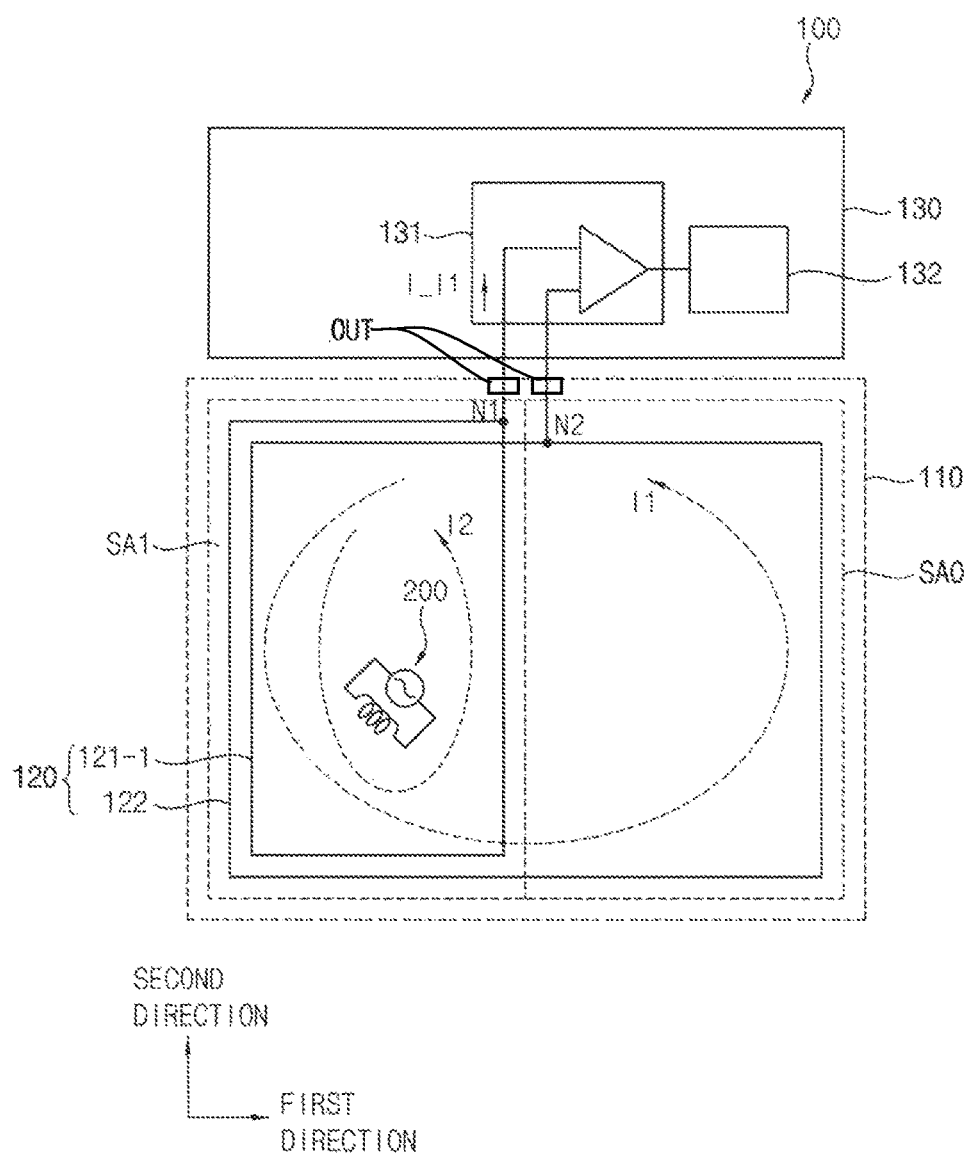
FIG. 1 is a diagram illustrating an electronic pen sensing device according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating an electronic pen sensing device according to one or more exemplary embodiments.

Referring to FIG. 1, the electronic pen sensing device 100 may include a substrate 110, a first closed loop line 120 (or a first closed circuit), and a controller 130. The electronic pen sensing device 100 may generate a first induction current I_I1 (or a first induced current) based on a magnetic field generated by the electronic pen 200 and may sense or detect a position (or a location, or location information) of the electronic pen 200 based on the first induction current I_I1. The substrate 110 and the first closed loop line 120 (i.e., remaining components of the electron pen sensing device 100 except for the controller 130) may be referred to as an electronic pen sensing panel.

The substrate 110 may include a sensing region SA0, and a first sub sensing region SA1. Here, the sensing region SA0 may have a maximum area (or a maximum coverage) to sense the electronic pen 200, and the first sub sensing region SA1 may be included in the sensing region SA0. For example, the first sub sensing region SA1 may have a width (or height) which is smaller (or more reduced) than a width (or height) of the sensing region SA0 in a first direction. Referring to FIG. 1, the substrate 110 (or the sensing region SA0) encloses the first sub sensing region SA1. However, the substrate 110 (or the sensing region SA0) is not limited thereto. For example, the substrate 110 (or the sensing region SA0) may include a plurality of sub sensing regions.

The first closed loop line 120 may be disposed on the substrate 110, disposed along edges of the sensing region SA0 from a first node N1 to a second node N2 and wound in a first rotation direction N times, and disposed along edges of the first sub sensing region SA1 from the second node N2 to the first node N1 and wound in the first rotation direction M times, where each of N and M is a positive integer. Here, the first rotation direction may be clockwise or counterclockwise.

According to one or more exemplary embodiments, the first closed loop line 120 may include a main pattern 122 and a first sub pattern 121-1. The main pattern 122 may be disposed along the edges of the sensing region SA0. For example, the main pattern 122 may be a main coil which is wound in the first rotation direction (or a first winding direction). The first sub pattern 121-1 may be disposed along the edges of the first sub sensing region SA1. For example, the first sub pattern 121-1 may be a first auxiliary coil which is wound in the first rotation direction. As illustrated in FIG. 1, the first sub pattern 121-1 may be electrically connected to the main pattern 122 to form a twisted closed loop structure. That is, the first closed loop line 120 may form a closed loop structure using patterns (e.g., the main pattern 122 and the first sub pattern 121-1) having different widths (or heights).

The main pattern 122 may generate a first current I1 in response to the magnetic field of the electronic pen 200. For example, when the electronic pen 200 generates the magnetic field, the first current I1 may be induced to the main pattern 122 based on the magnetic field. Here, the first current I1 may flow in the first rotation direction. The first sub pattern 121-1 may generate a second current I2 in response to the magnetic field of the electronic pen 200. For example, when the electronic pen 200 generates the magnetic field, the second current I2 may be induced to the first sub pattern 121-1 based on the magnetic field. In this case, the first induction current I_I1 output through the first node N1 to an outside of the first closed loop line 120 may be a current difference between the second current I2 and the first current I1 (i.e., I_I1=I2−I1). The first induction current I_I1 may be input through the second node N2 to the first closed loop line 120.

In an example embodiment, the first closed loop line 120 may be electrically connected to the controller 130 through an output terminal. As illustrated in FIG. 1, when the controller 130 is distinguished from the substrate 110 (e.g., the controller 130 is implemented as an integrated circuit (IC) or a flexible printed circuit (FPC)), the electronic pen sensing device 100 (or the electronic pen sensing panel) may include output terminals OUT which are respectively connected to the first node N1 and the second node N2 and which output the first induction current I_I1 to external component. In this case, the controller 130 may receive the first induction current I_I1 through the output terminals OUT.

The controller 130 may calculate a location of the electronic pen 200 in response to the first induction current I_I1.

According to one or more exemplary embodiments, the controller 130 may include a sensing unit 131 and a calculating unit 132. The sensing unit 131 may output a sensing signal by amplifying the first induction current I_I1 and may calculate the location of the electronic pen 200. For example, the calculating unit 132 may include a look-up table which includes (or defines) a correlation between the sensing signal and the location of the electronic pen 200, and may obtain the location of the electronic pen 200 corresponding to the sensing signal from the look-up table. A configuration of the controller 130 will be described in detail with reference to FIGS. 2A and 2B.

As described above, the electronic pen sensing device 100 may generate the first induction current I_I1 in the first closed loop line 120, which includes the main pattern 122 and the first sub pattern 121-1. The electronic pen sensing device 100 may sense the electronic pen 200 based on the first induction current I_I1, where the main pattern 122 is electrically connected to the first sub pattern 121-1 to form a twisted closed loop structure. Especially, the first sub pattern 121-1 is electrically connected to the main pattern 122 in parallel circuit, so the equivalent resistance of the first closed loop line 120 (or a combined resistance of the main pattern 122 and the first sub pattern 121-1) between the first node N1 and the second node N2 may be reduced according to a resistance of the first sub pattern 121-1. Therefore, the electronic pen sensing device 100 may have improved sensing sensitivity and improved sensing accuracy in sensing the electronic pen 200 (or the location of the electronic pen 200) by reducing the equivalent resistance of the first closed loop line 120.

Figure 2A:
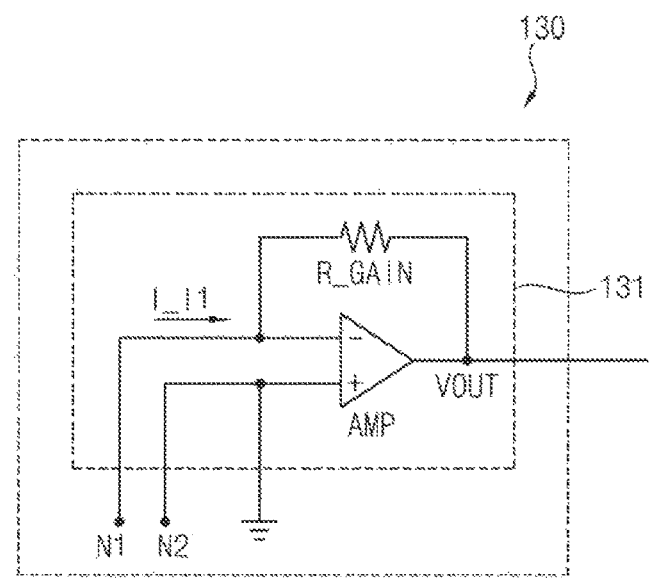
FIG. 2A is a diagram illustrating a controller included in the electronic pen sensing device of FIG. 1, according to one or more exemplary embodiments.
Figure 2B:
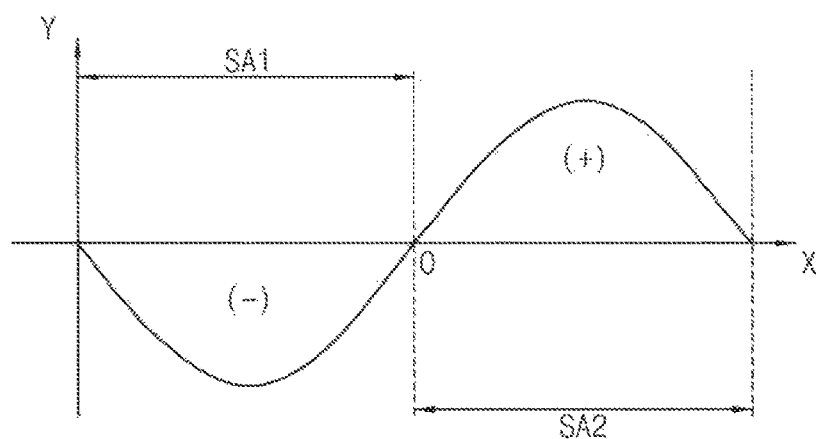
FIG. 2B is a diagram illustrating an output signal generated by the controller of FIG. 2B, according to one or more exemplary embodiments.

FIG. 2A is a diagram illustrating a controller 130 included in the electronic pen sensing device of FIG. 1, according to one or more exemplary embodiments. FIG. 2B is a diagram illustrating an output signal generated by the controller 130 of FIG. 2B, according to one or more exemplary embodiments.

Referring to FIGS. 1 and 2A, the controller 130 may include the sensing unit 131, and the sensing unit 131 may include an amplifier AMP and a resistor R_GAIN. A first input (or an inverting input) terminal of the amplifier AMP may be electrically connected to the first node N1, and a second input (or a non-inverting input) terminal of the amplifier AMP may be electrically connected to the second node N2 and a reference voltage (e.g., a ground voltage or 0 volts (V)). The resistor R_GAIN may be electrically connected between the first input terminal of the amplifier AMP and an output terminal of the amplifier AMP.

The sensing unit 131 may output a sensing signal VOUT by amplifying the first induction current I_I1. For example, the sensing unit 131 may output the sensing signal VOUT by inversely-amplifying the first induction current I_I1, and the sensing signal VOUT may have a value which is equal to a value multiplied by the first induction current I_I1 and the resistor R_GAIN (i.e., VOUT=−I_I1*R_GAIN).

Referring to FIGS. 1, 2A, and 2B, the sensing signal VOUT may be changed according to a position of the electronic pen 200 (or according to a change of a position of the electronic pen 200). In FIG. 2B, an X axis (or a horizontal axis) may represent a position of the electronic pen 200, and an Y axis (or a vertical axis) may represent a sensing signal VOUT (or a value of the sensing signal VOUT). For example, the X axis may represent a coordinate value in the first direction of the electronic pen 200 on a two-dimensional plane including the first direction and a second direction, where the second direction may be substantially perpendicular to the first direction.

As illustrated in FIG. 2B, when the electronic pen 200 is located in (or above) the first sub sensing region SA1, the sensing signal VOUT may have a negative value. For example, when the electronic pen 200 is located in the first sub sensing region SA1, the second current I2 may be greater than the first current I1. In this case, the first induction current I_I1 may have a positive value, and the sensing signal VOUT may have a negative value according to inversely-amplifying of the first induction current I_I1. Especially, when the electronic pen 200 is located in (or above) a center of the first sub sensing region SA1, the second current I2 may have a maximum value, and the sensing signal VOUT may have a maximum negative value.

When the electronic pen 200 is located at a boundary of the first sub sensing region SA1 intersecting the sensing region SA0, the sensing signal VOUT may have a value of 0. For example, when the electronic pen 200 is located at the boundary of the first sub sensing region SA1 intersecting the sensing region SA0, the second current I2 may have a value which is equal to a value of the first current I1.

When the electronic pen 200 is located in the sensing region SA0 not overlapping the first sub sensing region SA1, the sensing signal VOUT may have a positive value. For example, when the electronic pen 200 is located in the first direction of the sensing region SA0, the second current I2 may be smaller than the first current I1. In this case, the first induction current I_I1 may have a negative value, and the sensing signal VOUT may have a positive value according to inversely-amplifying of the amplifier AMP.

As illustrated in FIG. 2B, the sensing signal VOUT, which is generated by the controller 130, may changed according to a position of the electronic pen 200, and the controller 130 may calculate a location (or a coordinate vale) of the electronic pen 200 based on the sensing signal VOUT.

Figure 3:
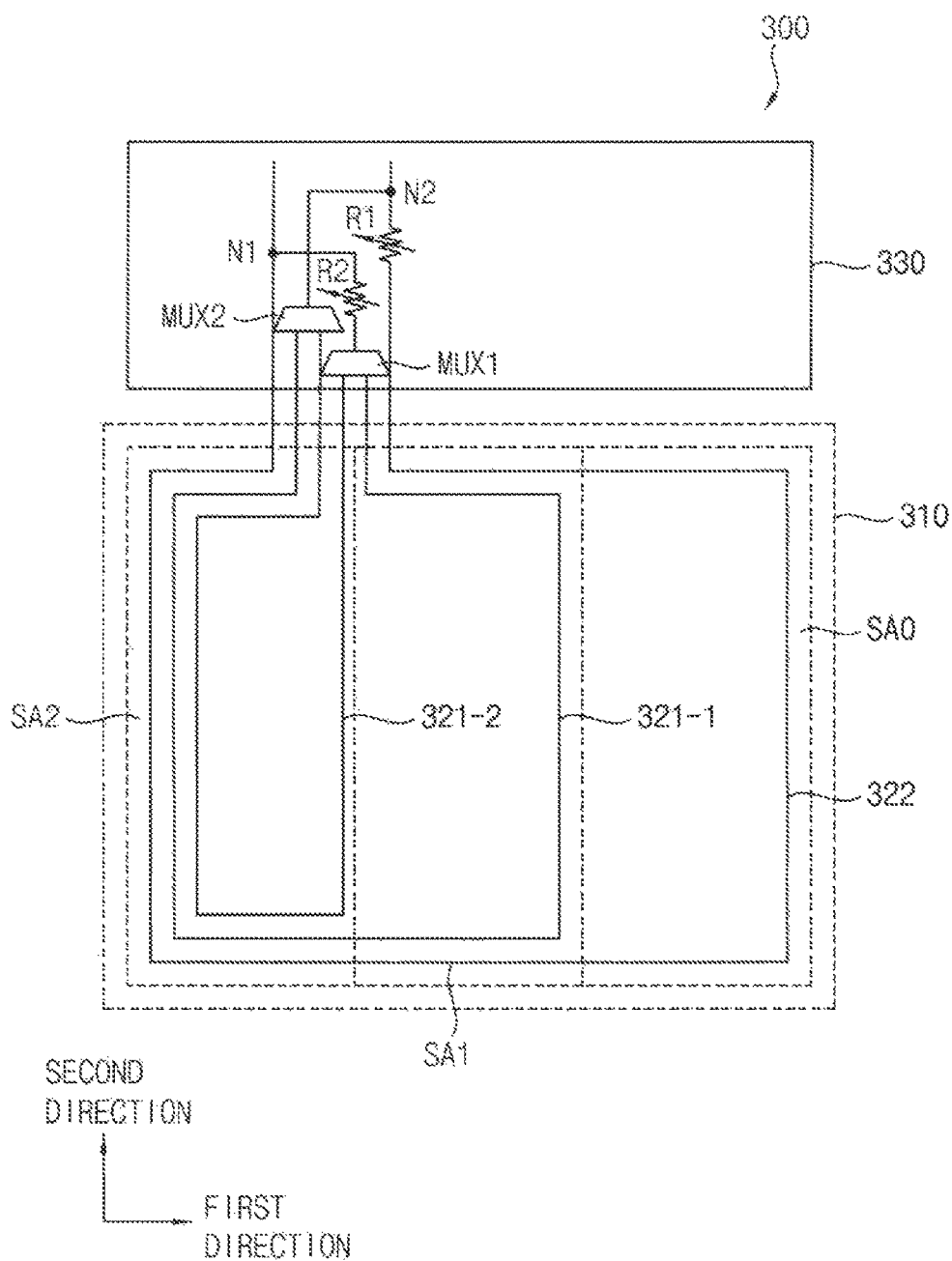
FIG. 3 is a diagram illustrating an electronic pen sensing device according to one or more exemplary embodiments.

FIG. 3 is a diagram illustrating an electronic pen sensing device according to one or more exemplary embodiments.

Referring to FIGS. 1 and 3, an electronic pen sensing device 300 may include a substrate 310, a main pattern 322, a first sub pattern 321-1, a second sub pattern 321-2, and a controller 330. The electronic pen sensing device 300 illustrated in FIG. 3 may select one of the first sub pattern 321-1 and the second sub pattern 321-2 and may form a closed loop by electrically connecting the selected one of the first sub pattern 321-1 and the second sub pattern 321-2 to the main pattern 322.

The substrate 310 may be the same as or substantially the same as the substrate described with reference to FIG. 1. The main pattern 322 and the first pattern 321-1 may be the same as or substantially the same as the main pattern 322 and the first pattern 321-1 described with reference to FIG. 1, respectively. Therefore, duplicated descriptions will not be repeated.

The substrate 310 (or the sensing region SA0) may include a second sensing region SA2 which has a width (or a height) smaller than the width (or the height) of the first sub sensing region SA1.

An edge of the second sub pattern 321-2 may be disposed overlapping an edge of the second sub sensing region SA2. For example, the second sub pattern 321-2 may surround the edges of the second sub sensing region SA2 from the second node N2 to the first node N1 and wound in the first rotation direction L times, where L is a positive integer. For example, the second sub pattern 321-2 may be a second auxiliary coil which is wound along the first rotation direction (or the first winding direction). The second sub pattern 321-2 may be enclosed in the first closed loop 320 described with reference to FIG. 1.

The controller 330 may include a first switching unit MUX1 and a second switching unit MUX2. The first switching unit MUX1 may select one of the first sub pattern 321-1 and the second sub pattern 321-2 and may electrically connect the selected one of the first sub pattern 321-1 and the second sub pattern 321-2 to the first node N1. The second switching unit MUX2 may electrically connect the selected one of the first sub pattern 321-1 and the second sub pattern 321-2 to the second node N2. In this case, the main pattern 322 may form a closed loop with one of the first sub pattern 321-1 and the second sub pattern 321-2.

According to one or more exemplary embodiments, the controller 330 may electrically connect the first sub pattern 321-1 between the first node N1 and the second node N2 in a first sensing period and may electrically connect the second sub pattern 321-2 between the first node N1 and the second node N2 in a second sensing period. Here, the first sensing period and the second sensing period may be set (or pre-set) to sense the electronic pen 200, and the second sensing period may be different from the first sensing period (i.e., the second sensing period may not overlap the first sensing period). That is, the controller 330 may sequentially scan the sensing region SA0 which is divided into a plurality of regions. In this case, the controller 330 may calculate the location of the electronic pen 200 based on a scan result.

The controller 330 may calculate the location of the electronic pen 200 by combining a sensing signal VOUT in the first sensing period and a sensing signal VOUT in the second sensing period. For example, when the electronic pen 200 is located on the second sub sensing region SA2, the sensing signal VOUT in the first sensing period may have a negative value and the sensing signal VOUT in the second sensing period may have a negative value. For example, when the electronic pen 200 is located on a portion of the first sub sensing region SA1 not overlapping the second sub sensing region SA2, the sensing signal VOUT in the first sensing period may have a negative value and the sensing signal VOUT in the second sensing period may have a positive value.

Referring to FIG. 3, the first switching unit MUX1 and the second switching unit MUX2 are included in the controller 330. However, the exemplary embodiments are not limited thereto. For example, the first switching unit MUX1 and the second switching unit MUX2 may be included in the substrate 310 or may be disposed on the substrate 310.

In addition, referring to FIG. 3, the substrate 310 (or the sensing region SA0) includes two sub sensing regions (i.e., the first sensing region 321-1 and the second sensing region 321-2). However, the exemplary embodiments are not limited thereto. For example, the substrate 310 may include X number of sub sensing regions, where X is equal to or more than 3. In this case, the electronic pen sensing device 300 may include X number of sub patterns, and a Yth sub pattern may have a width (or a height) smaller than a width (or a height) of a (Y−1)th sub pattern, where Y is more than 3 and smaller than X.

According to one or more exemplary embodiments, the controller 330 may include a first variable resistor R1 and a second variable resistor R2. For example, the first variable resistor R1 may be electrically connected between the main pattern 322 and the second node N2, and the second variable resistor R2 may be electrically connected between the first node N1 and the first switching unit MUX1. For example, the first variable resistor R1 may be electrically connected between the main pattern 322 and the first node N1, and the second variable resistor R2 may be electrically connected between the second node N2 and the second switching unit MUX2.

According to one or more exemplary embodiments, the main pattern 322, the first sub pattern 321-1, and the second sub pattern 321-2 may have different shapes and different lengths. In this case, inductance (or resistance) of the main pattern 322, inductance (or resistance) of the first sub pattern 321-1, and inductance (or resistance) of the second sub pattern 321-2 may be different from each other. The controller 330 may not obtain the sensing signal VOUT illustrated in FIG. 2B (i.e., the controller 330 may obtain the sensing signal VOUT having a value which is different from an idle value). Therefore, the controller 330 may obtain the sensing signal VOUT (or an idle value) illustrated in FIG. 2B by controlling (or adjusting, changing) at least one of the first variable resistor R1 and the second variable resistor R2.

The first resistor R1 may be used to compensate a variation (e.g., an inductance variation or a resistance variation) between the main pattern 322 and the sub patterns (i.e., the first sub pattern 321-1 and the second sub pattern 321-2). The second resistor R2 may be used to compensate a variation (e.g., an inductance variation or a resistance variation) between the sub patterns (i.e., the first sub pattern 321-1 and the second sub pattern 321-2).

As described above, the electronic pen sensing device 300 may include a plurality of sub patterns (e.g., the first sub pattern 321-1, the second sub pattern 321-2, etc), which are respectively disposed along edges of a plurality of sub sensing regions (e.g., the first sub sensing region SA1, the second sub sensing region SA2, etc). The electronic pen sensing device 300 may form a closed circuit by selectively and electrically connecting one of the plurality of the sub patterns to the main pattern 322, and may calculate the location of the electronic pen 200 based on the first induction current I_I1 induced to the closed loop. In addition, the electronic pen sensing device 300 may include the first variable resistor R1 and the second variable resistor R2 which are electrically connected between the main pattern 322 and the plurality of the sub patterns (e.g., the first sub pattern 321-1, the second sub pattern 321-2, etc). Therefore, the electronic pen sensing device 300 may have improved accuracy in sensing the electronic pen 200.

Figure 4:
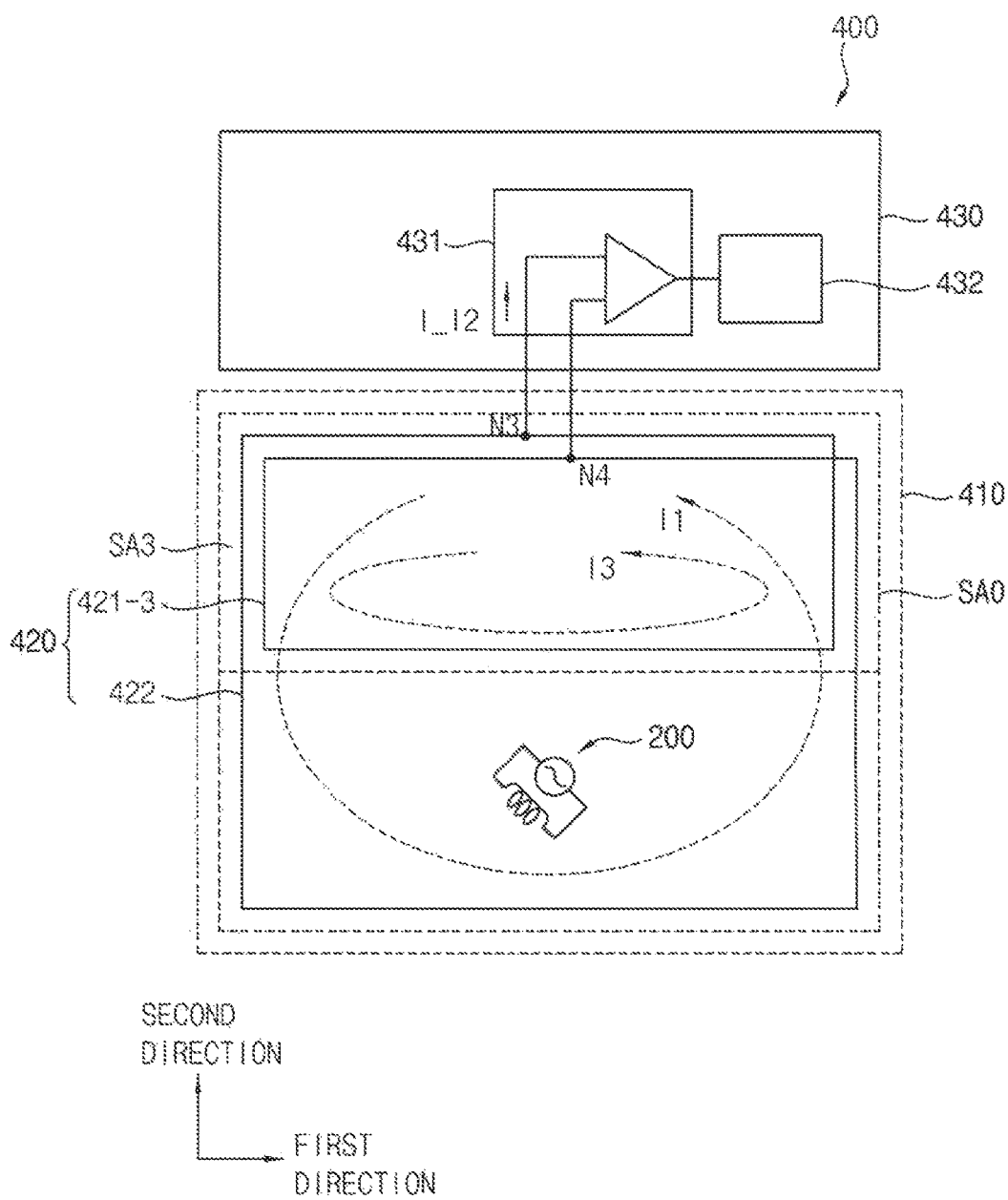
FIG. 4 is a diagram illustrating an electronic pen sensing device according to one or more exemplary embodiments.

FIG. 4 is a diagram illustrating an electronic pen sensing device according to one or more exemplary embodiments.

Referring to FIGS. 1 and 4, the electronic pen sensing device 400 illustrated in FIG. 4 may be the same as or substantially the same as the electronic pen sensing device 100 illustrated in FIG. 1. Therefore, duplicated descriptions will not be repeated.

The substrate 410 (or the sensing region SA0) may include a third sub sensing region SA3. Here, the sensing region SA0 may be the same as or substantially the same as the sensing region SA0 described with reference to FIG. 1. The third sub sensing region SA3 may have a height (or a width) smaller than a height (or width) of the sensing region SA0 in the second direction, where the second direction is perpendicular to the first direction.

A second closed loop line 420 (or a second closed circuit) may be disposed on the substrate 410 surrounding the edges of the sensing region SA0 from a third node N3 to a fourth node N4 in the first rotation direction, and surrounding edges of the third sub sensing region SA3 from the fourth node N4 to the third node N3 in the first rotation direction. Here, the third node N3 may be the same as or substantially the same as the first node N1 illustrated in FIG. 1, and the fourth node N4 may be the same as or substantially the same as the second node N2 illustrated in FIG. 1.

The second closed loop line 420 may include a main pattern 422 and a third sub pattern 421-3. The main pattern 422 may be disposed along the edge of the sensing region SA0 and may be the same as or substantially the same as the main pattern 122 described with reference to FIG. 1. The third sub pattern 421-3 may be disposed along the edges of the third sub sensing region SA3. For example, the third sub pattern 421-3 may be disposed surrounding the edges of the third sub sensing region SA3 from the fourth node N4 to the third node N3 in the first rotation direction. For example, the third sub pattern 421-3 may be a third auxiliary coil wound in the first rotation direction (or the first winding direction).

As described with reference to FIG. 1, the main pattern 422 may generate the first current I1 based on the magnetic field of the electronic pen 200. The third sub pattern 421-3 may generate a third current I3 based on the magnetic field of the electronic pen 200. That is, the third current I3 may be induced to the third sub pattern 421-3 by the magnetic field of the electronic pen 200. In this cased, a second induction current I_I2, which is output through the third node N3 to an outside of the second closed loop line 420, may be a current difference between the third current I3 and the first current I1 (i.e., I_I2=I3−I1).

The controller 430 may calculate a location of the electronic pen 200 based on the second induction current I_I2. As described with reference to FIG. 2B, the electronic pen sensing device 100 illustrated in FIG. 1 may calculate a location in the first direction of the electronic pen 200, and the electronic pen sensing device 400 illustrated in FIG. 4 may calculate a location in a second direction of the electronic pen 200.

Figure 5A:
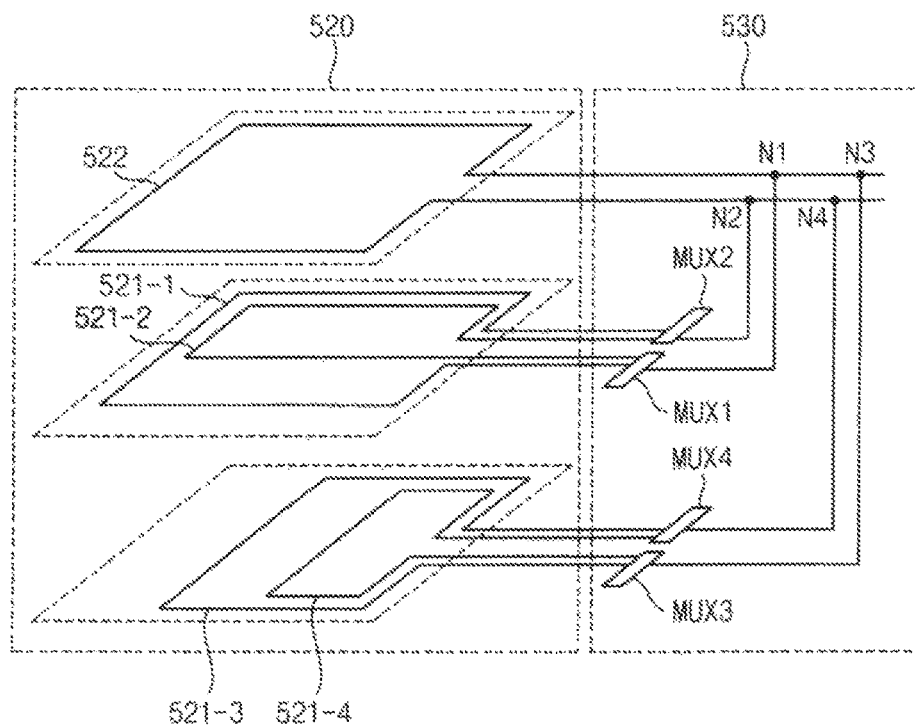
FIG. 5A is a diagram illustrating an electronic pen sensing device according to one or more exemplary embodiments.
Figure 5A:
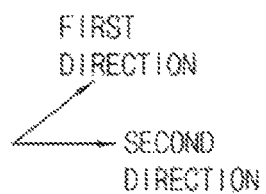
Figure 5B:
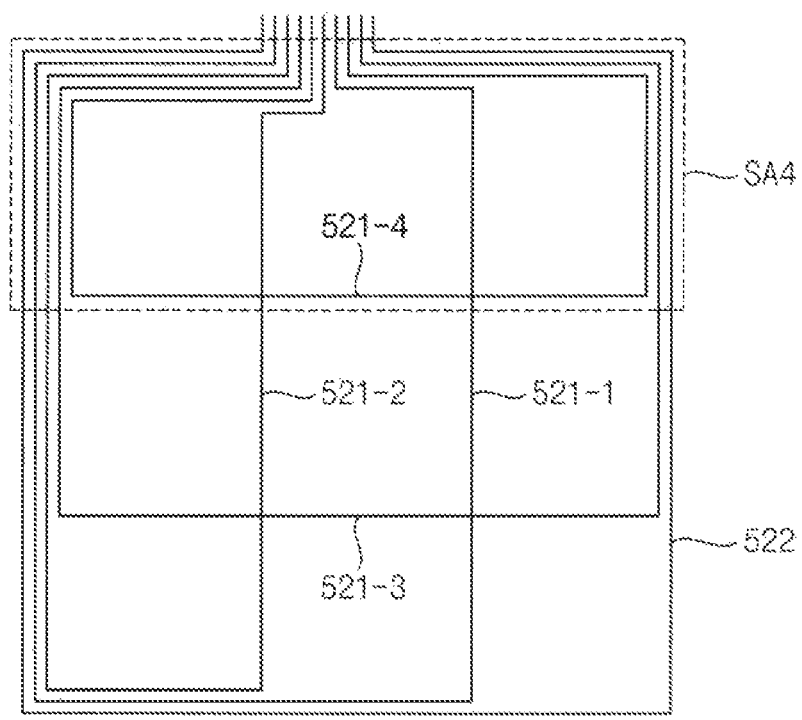
FIG. 5B is a diagram illustrating a closed loop line included in the electronic pen sensing device of FIG. 5A according to one or more exemplary embodiments.
Figure 5B:
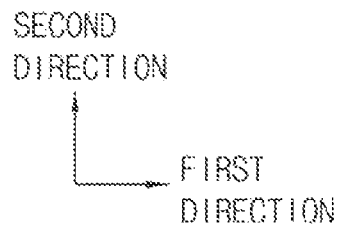

FIG. 5A is a diagram illustrating an electronic pen sensing device according to one or more exemplary embodiments. FIG. 5B is a diagram illustrating a closed loop line included in the electronic pen sensing device of FIG. 5A according to one or more exemplary embodiments.

Referring to FIGS. 3, 4, 5A, and 5B, a third closed loop line 520 may include a main pattern 522, a first sub pattern 521-1, a second sub pattern 521-2, a third sub pattern 521-3, and a fourth sub pattern 521-4.

The main pattern 522, the first sub pattern 521-1, and the second sub pattern 521-2 may be the same as or substantially the same as the main pattern 322, the first sub pattern 321-1, and the second sub pattern 321-2 which are described with reference to FIG. 3, respectively. In addition, the third sub pattern 521-3 may be the same as or substantially the same as the third sub pattern 421-3 described with reference to FIG. 4. Therefore, duplicated description will not be repeated.

The fourth sub pattern 521-4 may be disposed along edges of a fourth sub sensing region SA4. Here, the fourth sub sensing region SA4 may have a height (or a width) smaller than the height (or the width) of the third sub sensing region SA3 in the second direction. For example, the fourth sub pattern 521-4 may surround the fourth sub sensing region SA4 (or the edge of the fourth sub sensing region SA4) from the fourth node N4 to the third node N3 illustrated in FIG. 3 and wound in the first rotation direction L times, where L is a positive integer. For example, the fourth sub pattern 521-4 may be a fourth auxiliary coil wound in the first rotation direction (or the first winding direction).

According to one or more exemplary embodiments, the first sub pattern 521-1 and the second sub pattern 521-2 may be disposed on a first layer (or in a first layer), and the third sub pattern 521-3 and the fourth sub pattern 521-4 may be disposed on a second layer (or in a second layer). Here, the second layer may be different from the first layer. The main pattern 522 may be disposed on the first layer, on the second layer, or a third layer (or in the first layer, in the second layer, or in a third layer), where the third layer is different from the first layer and the second layer.

The electronic pen sensing device 100 may calculate a location in the first direction of the electronic pen 200 using the main pattern 522 and one of the first sub pattern 521-1 and the second sub pattern 521-2. In addition, the electronic pen sensing device 100 may calculate a location in the second direction of the electronic pen 200 using the main pattern 522 and one of the third sub pattern 521-3 and the fourth sub pattern 521-4.

According to one or more exemplary embodiments, the electronic pen sensing device 100 may select one among the first sub pattern 521-1 through the fourth sub pattern 521-4, and may electrically connect the selected one of the first sub pattern 521-1 through the fourth sub pattern 521-4 to the first node N1 (or to the third node N3), and may electrically connect the selected one of the first sub pattern 521-1 through the fourth sub pattern 521-4 to the second node N2 (or to the fourth node N4).

According to one or more exemplary embodiments, the electronic pen sensing device 100 may include a first switching unit MUX1, a second switching unit MUX2, a third switching unit MUX3, and a fourth switching unit MUX4. Here, the first switching unit MUX1 may select one of the first sub pattern 521-1 and the second sub pattern 521-2 and may electrically connect the selected one of the first sub pattern 521-1 and the second sub pattern 521-2 to the first node N1. The second switching unit MUX2 may electrically connect the selected one of the first sub pattern 521-1 and the second sub pattern 521-2 to the second node N2. The third switching unit MUX3 may select one of the third sub pattern 521-3 and the fourth sub pattern 521-4, and may electrically connect the selected one of the third sub pattern 521-3 and the fourth sub pattern 521-4 to the third node N3. The fourth switching unit MUX4 may electrically connect the selected one of the third sub pattern 521-3 and the fourth sub pattern 521-4 to the fourth node N4. In this case, the electronic pen sensing device 100 may calculate the location in the first direction of the electronic pen 200 based on the first induction current I_I1 illustrated in FIG. 1 and may calculate the location in the second direction of the electronic pen 200 based on the second induction current I_I2 illustrated in FIG. 3.

According to one or more exemplary embodiments, the electronic pen sensing device 100 may scan sub sensing regions (e.g., the first sub sensing region SA1 and the second sub sensing region SA2) arranged along the first direction and sensing sub regions (e.g., the third sensing regions SA3 and the fourth sensing regions SA4) arranged along the second direction, concurrently (or at the same time, independently). For example, in the first sensing period, the electronic pen sensing device 100 may electrically connect the first sub pattern 521-1 between the first node N1 and the second node N2 and may electrically connect the third sub pattern 521-3 between the first node N3 and the second node N4. For example, in the second sensing period, the electronic pen sensing device 100 may electrically connect the second sub pattern 521-2 between the first node N1 and the second node N2 and may electrically connect the fourth sub pattern 521-4 between the first node N3 and the second node N4. That is, the electronic pen sensing device 100 may calculate the location in the second direction of the electronic pen 200 independently from calculating the location in the first direction of the electronic pen 200.

According to one or more exemplary embodiments, the electronic pen sensing device 100 may include a first switching unit MUX1 and a second switching unit MUX2. Here, the first switching unit MUX1 may select one among the first sub pattern 521-1 through the fourth sub pattern 521-4 and may electrically connect the one among the first sub pattern 521-1 through the fourth sub pattern 521-4 to the first node N1 (or the third node N3). The switching unit MUX2 may electrically connect the one among the first sub pattern 521-1 through the fourth sub pattern 521-4 to the second node N2 (or the fourth node N4). For example, the third switching unit MUX3 illustrated in FIG. 5A may be included in the first switching unit MUX1, and the fourth switching unit MUX4 illustrated in FIG. 5A may be included in the second switching unit MUX2. In this case, the electronic pen sensing device 100 may electrically connect the one among the first sub pattern 521-1 through the fourth sub pattern 521-4 between the first node N1 and the second node N2 using the first switching unit MUX1 and the second switching unit MUX2.

According to one or more exemplary embodiments, the electronic pen sensing device 100 may scan the first sub sensing region SA1 through the fourth sub sensing region SA4 in sequence. For example, the electronic pen sensing device 100 may electrically connect the first sub pattern 521-1 between the first node N1 and the second node N2 in a first sensing period, may electrically connect the second sub pattern 521-2 between the first node N1 and the second node N2 in a second sensing period, may electrically connect the third sub pattern 521-3 between the third node N3 and the fourth node N4 in a third sensing period, and may electrically connect the fourth sub pattern 521-4 between the third node N3 and the fourth node N4 in a fourth sensing period. Here, the first through fourth sensing periods may be different from each other (i.e., the first through fourth sensing periods may be not overlap mutually).

According to one or more exemplary embodiments, the first sub pattern 521-1 through the fourth sub pattern 521-4 may be a touch sensing electrodes. Here, the touch sensing electrodes may be configured to sense a capacitive touch input. For example, in a touch sensing period, the electronic pen sensing device 100 may provide a sensing signal (or an alternating current voltage, AC voltage) and may sense a touch input based on a change of a capacitance between the first sub pattern 521-1 through the fourth sub pattern 521-4 due to the touch input. For example, in an electronic pen sensing period which is different from the touch sensing period, the electronic pen sensing device 100 may sense the electronic pen 200 based on an induction current (e.g., the first induction current I_I1 and/or the second induction current I_I2) which is induced by a magnetic field of the electronic pen 200.

As described above, the electronic pen sensing device 100 may include the main pattern 522, sub patterns (e.g., the first sub pattern 521-1 and the second sub pattern 521-2) arranged in the first direction, and sub patterns (e.g., the third sub pattern 521-3 and the fourth sub pattern 521-4) and may calculate the location in the first direction and the location in the second direction of the electronic pen 200 using the main pattern 522 and the sub patterns.

Figure 5C:
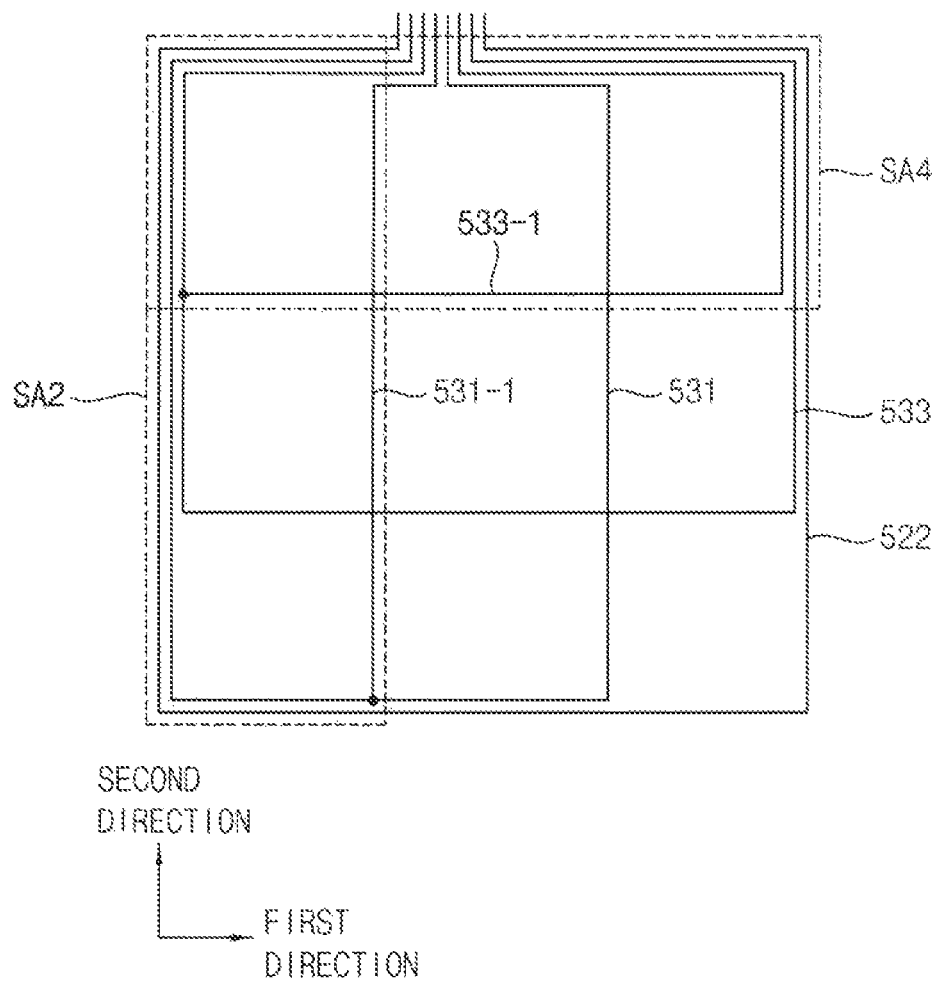
FIG. 5C is a diagram illustrating a closed loop line included in the electronic pen sensing device of FIG. 5A according to one or more exemplary embodiments.

FIG. 5C is a diagram illustrating a closed loop line included in the electronic pen sensing device of FIG. 5A according to one or more exemplary embodiments.

Referring to FIGS. 5B and 5C, the third closed loop 520 may include the main pattern 522, a first sub pattern 531, a first line pattern 531-1, a third pattern 533, and a third line pattern 533-1. Here, the main pattern 522, the first sub pattern 531, and the third sub pattern 533 may be the same as or substantially the same as the main pattern 522, the first sub pattern 521-1, and the third sub pattern 521-3 illustrated in FIG. 5B. Therefore, duplicated description will not be repeated.

The first line pattern 531-1 may be disposed along a boundary between the first sub sensing region SA1 and the second sub sensing region SA2, and one terminal of the first line pattern 531-1 may be electrically connected to the first sub pattern 531. In this case, a structure of a closed loop formed by the first line pattern 531-1 may be substantially the same as or similar to a structure of a closed loop formed by the second sub pattern 521-2 illustrated in FIG. 5B. For example, when the electronic pen sensing device 100 electrically connects the first line pattern 531-1 to the first node N1 using the first switching unit MUX1 and the electronic pen sensing device 100 electrically connects one terminal of the first sub pattern 531 to the second node N2 using the second switching unit MUX2, the structure of the closed loop formed by the first line pattern 531-1 may be formed in the second sub sensing region SA2.

That is, the electronic pen sensing device 100 may reduce a number of patterns and may reduce a number of input channels of a switching unit (e.g., the second switching unit MUX2) by using (or integrating) adjacent portions of the first sub pattern 521-1 and the second sub pattern 521-2 as a common pattern. Therefore, compared with the exemplary embodiment illustrated in FIG. 5B, the electronic pen sensing device 100 illustrate in FIG. 5C may further reduce a manufacturing cost by using the first line pattern 531-1.

Similarly to the first line pattern 531-1, the third line pattern 533-1 may be disposed along a boundary between the third sub sensing region SA3 and the fourth sub sensing region SA4, and one terminal of the third line pattern 533-1 may be electrically connected to the third sub pattern 533. In this case, a structure of a closed loop formed by the third line pattern 533-1 may be substantially the same as or similar to a structure of a closed loop formed by the fourth sub pattern 521-4 illustrated in FIG. 5B. For example, when the electronic pen sensing device 100 electrically connects the third line pattern 533-1 to the first node N1 using the first switching unit MUX1 and the electronic pen sensing device 100 electrically connects one terminal of the third sub pattern 533 to the second node N2 using the second switching unit MUX2, the structure of the closed loop formed by the third line pattern 533-1 may be formed in the fourth sub sensing region SA4.

As described above, the electronic pen sensing device 100 may reduce a number of patterns and a number of input channels of a switching unit (e.g., the second switching unit MUX2) by using (or integrating) adjacent portions of the sub patterns (e.g., the first sub pattern 521-1 and the second sub pattern 521-2) as a common pattern. Therefore, the electronic pen sensing device 100 illustrated in FIG. 5C may further reduce the manufacturing cost.

Referring to FIG. 5C, the third closed loop line 520 includes the first line pattern 531-1 extending in the first direction and the second line pattern 533-1 extending in the second direction. However, the exemplary embodiments are not limited thereto. For example, the third closed loop line 520 may include M number of vertical line patterns which extend in the first direction and N number of horizontal line patterns which extend in the second direction, where each of M and N is a integer equal to 2 or more.

Figure 6A:
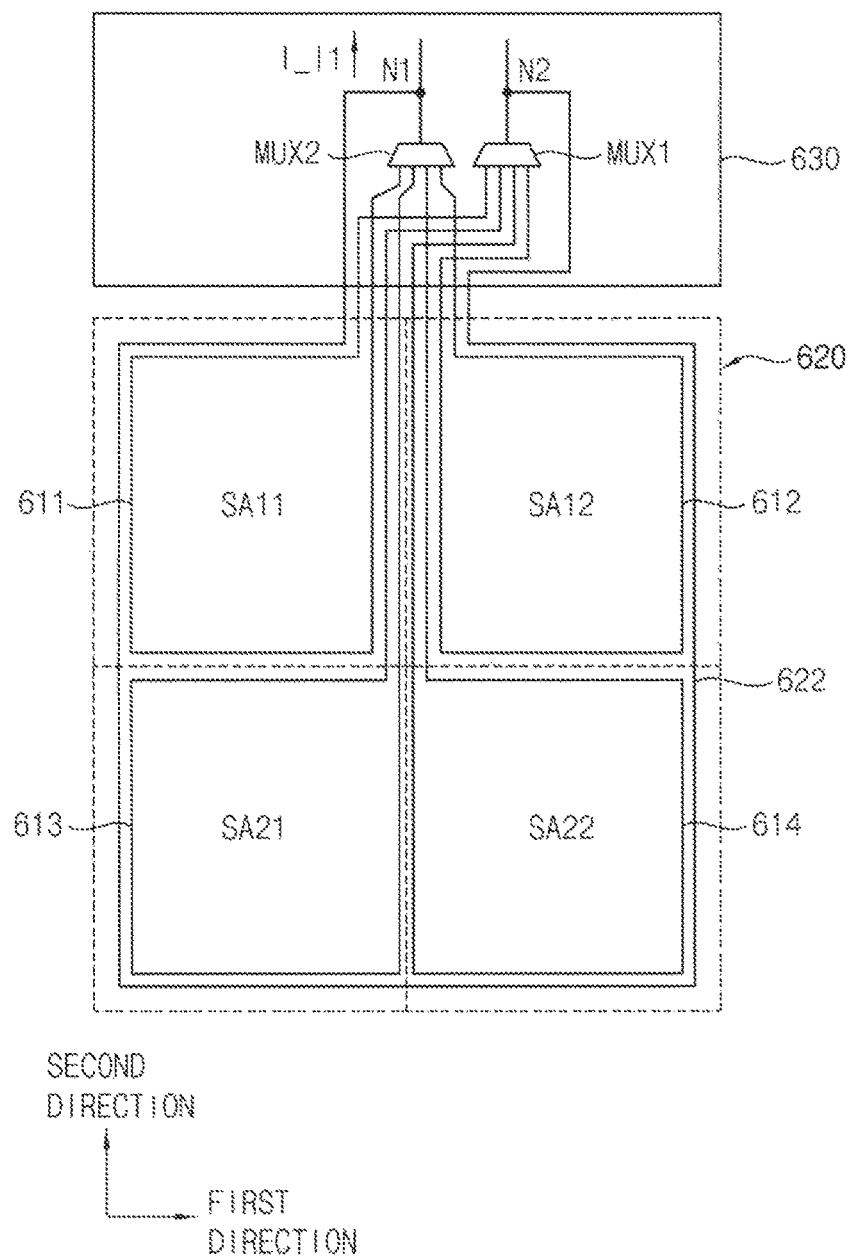
FIG. 6A is a diagram illustrating an electronic pen sensing device according to one or more exemplary embodiments.
Figure 6B:
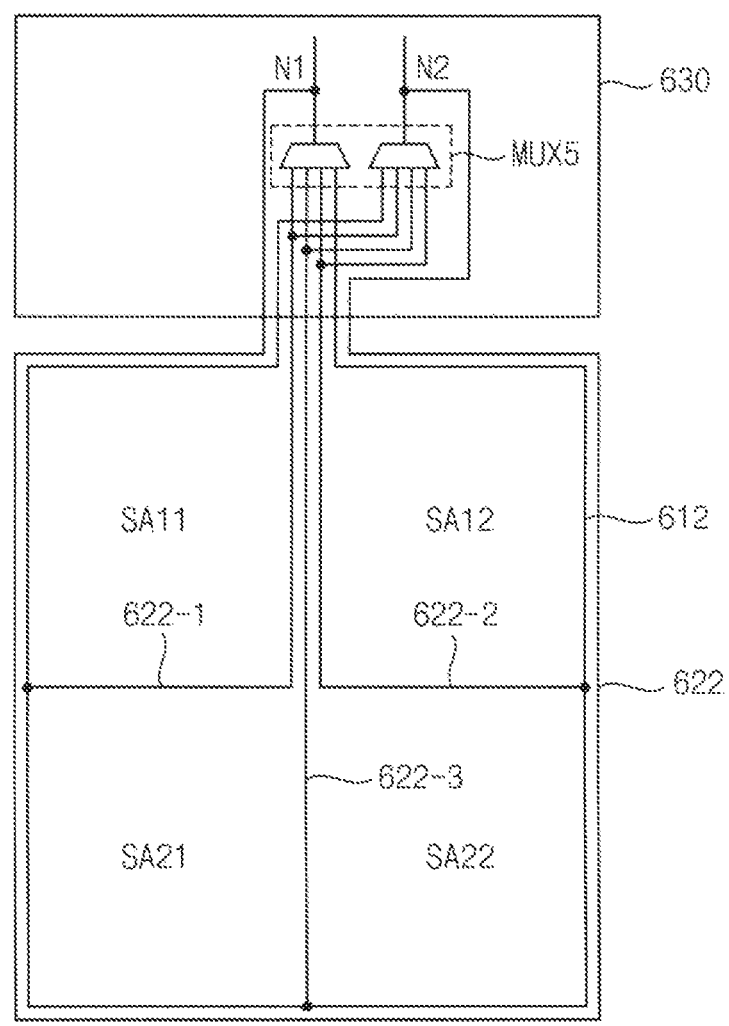
FIG. 6B is a diagram illustrating a closed loop line included in the electronic pen sensing device of FIG. 6A according to one or more exemplary embodiments.
Figure 6B:
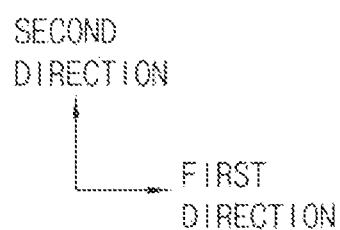

FIG. 6A is a diagram illustrating an electronic pen sensing device according to one or more exemplary embodiments. FIG. 6B is a diagram illustrating a closed loop line included in the electronic pen sensing device of FIG. 6A according to one or more exemplary embodiments.

Referring to FIGS. 1, 6A, and 6B, a substrate 610 may include sensing block regions dividing the sensing region SA0. For example, the substrate 610 may include an eleventh sensing block region SA11, a twelfth sensing block region SA12, a twenty-first sensing block region SA21, and a twenty-second sensing block region SA22. Referring to FIG. 6A, the substrate 610 includes four sensing block regions. However, the exemplary embodiments are not limited thereto. For example, the substrate 610 may include M*N (e.g., M rows by N columns) number of sensing block regions, where each of M and N is equal to 3 or more. Here, the sensing block regions may be disposed not overlapping each other.

The electronic pen sensing device 100 may include a main pattern 622, a first block pattern 611, a second block pattern 612, a third block pattern 613, and a fourth block pattern 614. The main pattern 622 may be the same as or substantially the same as the main pattern 122 described with reference to FIG. 1.

The first block pattern 611 may be disposed along edges of the eleventh sensing block region SA11 (or may surround the eleventh sensing block region SA11). For example, the first block pattern 611 may be disposed along the edges of the eleventh sensing block region SA11 from the second node N2 to the first node N1, and may be an eleventh auxiliary coil which wound in the first rotation direction.

The second block pattern 612 may be disposed along edges of the twelfth sensing block region SA12. For example, the second block pattern 612 may be disposed along the edges of the twelfth sensing block region SA12 from the second node N2 to the first node N1, and may be a twelfth auxiliary coil which wound in the first rotation direction.

Similarly, the third block pattern 613 may be disposed along edges of the twenty-first sensing block region SA21, and the fourth block pattern 614 may be disposed along edges of the twenty-second sensing block region SA22.

In an example embodiment, the main pattern 622 and the first through fourth block patterns 611 through 614 may be electrically connected to the controller 130 through output terminals. As illustrated in FIG. 6A, when the controller 630 is distinguished from the substrate 610 (e.g., when the controller 630 is implemented as an integrated circuit (IC) or a flexible printed circuit (FPC)), the electronic pen sensing device 100 (or the electronic pen sensing panel) may include the output terminals which are respectively connected to the main pattern 622 and the first through fourth block patterns 611 through 614 and which output induction currents induced by the main pattern 622 and the first through fourth block patterns 611 through 614 to external component.

The controller 630 may select one block pattern among the block patterns (e.g., the first through fourth block patterns 611 through 614), and electrically connect the selected block pattern with the main pattern 622, and may calculate the location of the electronic pen 200 based on a first current I_I1 output through the first node N1.

As illustrated in FIG. 6A the controller 630 may include a first switching unit MUX1 and a second switching unit MUX2. The first switching unit MUX1 may select one block pattern among the first through fourth block patterns 611 through 614, and may electrically connect the selected block pattern among the first through fourth block patterns 611 through 614 to the first node N1. The second switching unit MUX2 may select and electrically connect one block pattern among the first through fourth block patterns 611 through 614 to the second node N2. Accordingly, the controller 630 may select one block pattern among the first through fourth block patterns 611 through 614 and may form a closed loop structure using the main pattern 622 and the selected block pattern among the first through fourth block patterns 611 through 614.

A configuration of calculating the location of the electronic pen 200 based on the first induction current I_I1 may be the same as or substantially the same as a configuration of calculating the location of the electronic pen 200 described with reference to FIG. 1. Therefore, duplicated description will not be repeated.

According to one or more exemplary embodiments, adjacent partial patterns which are adjacent from each other may overlap each other, where the partial patterns are at least a portion of the block patterns. That is, some portions of the block patterns may form a common pattern (or may be integrated a common pattern).

Referring to FIGS. 6A and 6B, a first partial pattern 622-1 may be a portion of the first block pattern 611 illustrated in FIG. 6A and may be disposed adjacent to the third block pattern 613 illustrated in FIG. 6A. The first partial pattern 622-1 may overlap the third block pattern 613. That is, the first partial pattern 622-1 may be a first common pattern which is included in both the first block pattern 611 and the third block pattern 613. Similarly, a second partial pattern 622-2 may be a portion of the second block pattern 612 illustrated in FIG. 6A and may be disposed adjacent to the fourth block pattern 614 illustrated in FIG. 6A. The second partial pattern 622-2 may overlap the fourth block pattern 614. That is, the second partial pattern 622-2 may be a second common pattern which is included in both the second block pattern 612 and the fourth block pattern 614. A third partial pattern 622-3 may be a third common pattern which is included in both the third block pattern 613 and the fourth block pattern 614.

That is, the electronic pen sensing device 100 may include common patterns disposed at a region in which block patterns (i.e., the first through fourth block patterns 611 through 614) are adjacent from each other. Therefore, the electronic pen sensing device 100 may reduce a number of patterns and may reduce a number of input channels of a switching unit (e.g., the second switch unit MUX2).

The controller 630 may include a fifth switching unit MUX5 to electrically connect a partial pattern (e.g., one selected among the first through third partial patterns 621-1 through 621-3) to the first node N1 and the second node N2. Because the partial pattern (e.g., one selected among the first through third partial patterns 621-1 through 621-3) may be used in common for adjacent block patterns (e.g., two selected among the first through fourth block patterns 611 through 614), the partial pattern (e.g., one selected among the first through third partial patterns 621-1 through 621-3) may be selectively connected to the first node N1 or the second node N2. Therefore, the electronic pen sensing device 100 may electrically connect the selected partial pattern (e.g., one selected among the first through third partial patterns 621-1 through 621-3) to the first node N1 or the second node N2 using the fifth switching unit MUX5.

As described with reference to FIGS. 6A and 6B, the electronic pen sensing device 100 may include the sensing block regions SA11 through SA22, which divide the sensing region SA0, and the block patterns 611 through 614, which are respectively disposed in the sensing block regions SA11 through SA22, and may sequentially scan the sensing block regions SA11 through SA22 using the block patterns 611 through 614. In addition, the electronic pen sensing device 100 may integrate adjacent portions of the first through fourth block patterns 611 through 614 as a common pattern. Therefore, the electronic pen sensing device 100 may reduce an area for the patterns and may reduce a number of input channels of a switching unit (e.g., the second switch unit MUX2).

Figure 7:
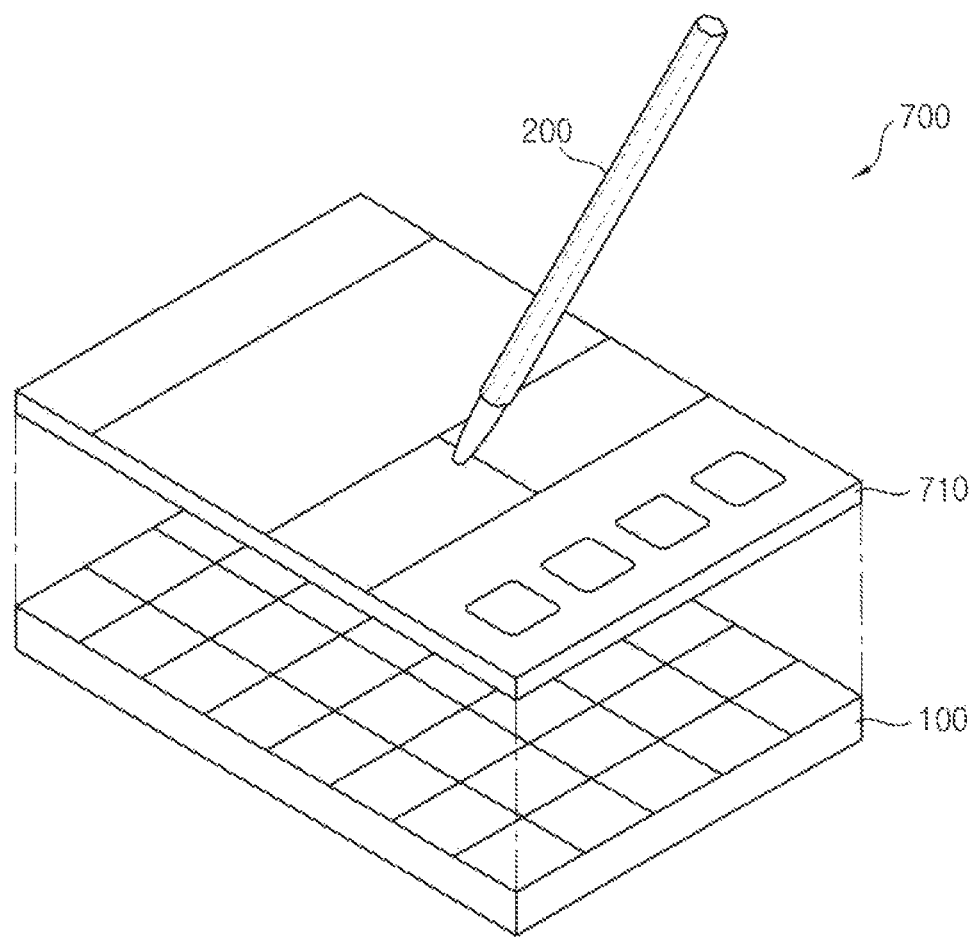
FIG. 7 is a diagram illustrating a display device according to one or more exemplary embodiments.

FIG. 7 is a diagram illustrating a display device according to one or more exemplary embodiments.

Referring to FIGS. 1 and 7, the display device 700 may include a display panel 710, the electronic pen sensing device 100, and the electronic pen 200.

The display panel 710 may display an image based on image data. For example, the display panel 710 may be an organic light emitting display panel. The display panel 710 may include pixels, and each of the pixels may temporally store a data signal in response to a gate signal and may emit a light based a stored data signal. Here, the data signal may be provided from a data driving circuit included in the display device 700, and the gate signal may be provided from a gate driving circuit included in the display device 700.

The electronic pen 200 may generate an electromagnetic force. For example, the electronic pen 200 may generate an induction current (or an induced electromagnetic force) based on an external electromagnetic force which is formed by an external device (e.g., the electronic pen sensing device 100) and may generate the electromagnetic force based on the induction current. For example, the electronic pen 200 may include a induction coil and a capacitor electrically connected to the induction coil in parallel, may store an induced electromagnetic force, which is induced by the induction coil based on the external electromagnetic force, in the capacitor and may generate the electromagnetic force through the induction coil by discharging the capacitor under a certain condition (e.g., when the external electromagnetic force disappears).

The electronic pen sensing device 100 may be the same as or substantially the same as the electronic pen sensing device 100 described with reference to FIG. 1. That is, the electronic pen sensing device 100 may sense (or recognize) the electronic pen 200 based on an electromagnetic force. Referring back to FIG. 1, the electronic pen sensing device 100 may include the substrate 110, the first closed loop line 120, and the controller 130. Here, the substrate 110 may include the sensing region SA0 and the first sub sensing region SA1 which has a width smaller than a width of the sensing region SA0 in the first direction. The closed loop line 120 may be disposed on the substrate 110 (or in the substrate 110), may surround the sensing region SA0 (or disposed along an edge of the sensing region SA0) from the first node N1 to the second node N2 in the first rotation direction, and may surround the first sub sensing region SA1 (or disposed along an edge of the first sub sensing region SA1) from the first node N1 to the second node N1 in the first rotation direction. The controller 130 may calculate the location of the electronic pen 200 based on an induction current (i.e., the first induction current I_I1) which is output through the first node N1 (and/or the second node N2).

According to one or more exemplary embodiments, the electronic pen sensing device 100 may generate the external electromagnetic force (i.e., the external electromagnetic force for driving the electronic pen 200). For example, the electronic pen sensing device 100 may include a power coil which surrounds the sensing region SA0 (or be disposed along the edge of the sensing region SA0). For example, the power coil may be the same as or substantially the same as the main pattern 122 illustrated in FIG. 1. In this case, the electronic pen sensing device 100 may generate the external electromagnetic force by providing a current to the power coil (or the main pattern 122) in a power supplying period and may sense the electronic pen 200 by using the first closed loop line 120 (e.g., a structure of a closed loop formed based on the main pattern 122 and the first sub pattern 121-1) in a sensing period.

As described above, the display device 700 may include the electronic pen 200 and the electronic pen sensing device 100 and may provide various input functions using the electronic pen 200.

The inventive concept may be applied to any display device (e.g., an organic light emitting display device, a liquid crystal display device, etc) including an electronic pen. For example, the present inventive concept may be applied to a television, a computer monitor a laptop, a digital camera, a cellular phone, a smart phone, a personal digital assistant (PDA), a portable multimedia player (PMP), an MP3 player, a navigation system, a video phone, etc.

Therefore, an electronic pen sensing device according to example embodiments may sense the electronic pen more accurately by from a closed loop using patterns (or coils) which have different widths, by sensing the electronic pen based on an induction current induced through the closed loop, and by changing a connection between the patterns.

In addition, the electronic pen sensing device may reduce a manufacturing cost of the electronic pen sensing device by integrating adjacent regions (or adjacent partial patterns) of the patterns as a common line (or a common pattern) such that an area for the patterns is reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electronic pen sensing device comprising:
   a substrate comprising a sensing region and a first sub sensing region, the first sub sensing region having a width smaller than a width of the sensing region;
   a first closed loop line comprising:
     a main pattern comprising a main coil disposed along edges of the sensing region and wound N times in a first rotation direction from a first node to a second node; and
     a first sub pattern comprising a first auxiliary coil disposed along edges of the first sub sensing region and wound M times in the first rotation direction from the second node to the first node; and
   a controller configured to calculate a location of an electronic pen based on a first induction current which is output through the first node,
   wherein N and M are positive integers.

2. The electronic pen sensing device of claim 1,
   wherein the main pattern is disposed along the edges of the sensing region, and
   wherein the first sub pattern is disposed along the edges of the first sub sensing region.

3. The electronic pen sensing device of claim 2, wherein the first induction current is a current difference between a first current and a second current,
   wherein the first current is induced by the main pattern in response to the location of the electronic pen, and
   wherein the second current is induced by the first sub pattern in response to the location of the electronic pen.

4. The electronic pen sensing device of claim 2, wherein the sensing region comprises a second sub sensing region having a width smaller than the width of the first sub sensing region in a first direction, and a second sub pattern comprising a second auxiliary coil disposed along edges of the second sub sensing region, and
   wherein an edge of the first closed loop line overlaps an edge of the second sub sensing region.

5. The electronic pen sensing device of claim 4, wherein the controller comprises:
   a first switching unit configured to select one of the first sub pattern and the second sub pattern and to electrically connect the selected one of the first sub pattern and the second sub pattern to the first node; and
   a second switching unit configured to electrically connect the selected one of the first sub pattern and the second sub pattern to the second node.

6. The electronic pen sensing device of claim 5, wherein the controller is configured to electrically connect the first sub pattern between the first node and the second node in a first sensing period and to electrically connect the second sub pattern between the first node and the second node in a second sensing period, and
   wherein the second sensing period is different from the first sensing period.

7. The electronic pen sensing device of claim 5, wherein the controller comprises:
   a first variable resistor electrically connected between the main pattern and the second node; and
   a second variable resistor electrically connected between the first node and the first switching unit.

8. The electronic pen sensing device of claim 4, wherein the sensing region further comprises a third sub sensing region and a fourth sub sensing region,
   wherein the third sub sensing region has a width smaller than the width of the sensing region in a second direction, the second direction substantially perpendicular to the first direction,
   wherein the fourth sub sensing region has a width smaller than the width of the third sub sensing region in the second direction, and
   wherein the first closed loop line further comprises:
     a third sub pattern disposed along edges of the third sub sensing region; and
     a fourth sub pattern disposed along edges of the fourth sub sensing region.

9. The electronic pen sensing device of claim 8, wherein the controller comprises:
   a first switching unit configured to select one among the first sub pattern through the fourth sub pattern and to electrically connect the selected one selected among the first sub pattern through the fourth sub pattern to the first node; and
   a second switching unit configured to electrically connect the selected one selected among the first sub pattern through the fourth sub pattern to the second node.

10. The electronic pen sensing device of claim 8, wherein the controller comprises:
    a first switching unit configured to select one of the first sub pattern and the second sub pattern and to electrically connect the first node and the selected one of the first sub pattern and the second sub pattern;
    a second switching unit configured to electrically connect the second node and the selected one of the first sub pattern and the second sub pattern;
    a third switching unit configured to select one of the third sub pattern and the fourth sub pattern and to electrically connect a third node and the selected one of the third sub pattern and the fourth sub pattern; and
    a fourth switching unit configured to electrically connect a fourth node and the selected one of the third sub pattern and the fourth sub pattern, and wherein the controller is configured to calculate a location in the first direction of the electronic pen in response to the first induction current and a location in the second direction of the electronic pen in response to a second induction current which is output through the third node.

11. The electronic pen sensing device of claim 10, wherein the controller is configured to:
electrically connect the first sub pattern between the first node and the second node in a first sensing period;
electrically connect the second sub pattern between the first node and the second node in a second sensing period;
electrically connect the third sub pattern between the third node and the fourth node in the first sensing period; and
electrically connect the fourth sub pattern between the third node and the fourth node in the second sensing period.

12. The electronic pen sensing device of claim 2, wherein the sensing region comprises a second sub sensing region which has a width smaller than a width of the first sub sensing region in a first direction, and
wherein the first closed loop line is disposed along a boundary between the first sub sensing region and the second sub sensing region and comprises a first line pattern of which one terminal is electrically connected to the first sub pattern.

13. The electronic pen sensing device of claim 12, wherein the controller comprises:
a first switching unit configured to select one of the first sub pattern and the first line pattern and to electrically connect the selected one of the first sub pattern and the first line pattern to the first node; and
a second switching unit configured to electrically connect the selected one of the first sub pattern and the first line pattern to the second node.

14. The electronic pen sensing device of claim 12, wherein the sensing region further comprises a third sub sensing region and a fourth sub sensing region,
wherein the third sub sensing region has a width smaller than the width of the sensing region in a second direction, the second direction substantially perpendicular to the first direction,
wherein the fourth sub sensing region has a width smaller than the width of the third sub sensing region in the second direction, and
wherein the first closed loop line further comprises:
a third sub pattern disposed overlapping an edge of the third sub sensing region; and
a second line pattern disposed on a boundary between the third sub sensing region and the fourth sub sensing region, the second line pattern electrically connected to the third sub pattern.

15. The electronic pen sensing device of claim 2, wherein the first sub pattern is a touch sensing electrode to sense a capacitive touch input.

16. The electronic pen sensing device of claim 1, wherein the controller comprises:
a sensing unit configured to output a sensing signal by amplifying the first induction current; and
a calculating unit configured to calculate the location of the electronic pen using a look-up table,
wherein the look-up table comprises a correlation between the sensing signal and the location of the electronic pen.

17. An electronic pen sensing device comprising:
a substrate comprising a sensing region and sensing block regions which are generated by dividing the sensing region;
a main pattern disposed on an edge of the sensing region from a first node to a second node along a first rotation direction;
a first block pattern disposed overlapping an edge of a first sensing block region among the sensing block regions from the second node to the first node along the first rotation direction;
a second block pattern disposed overlapping an edge of a second sensing block region among the sensing block regions from the second node to the first node along the first rotation direction; and
a controller configured to electrically connect one of the first block pattern and the second block pattern between the first node and the second node and to calculate a location of an electronic pen based on a first induction current which is output through the first node,
wherein the main pattern is formed independent from the first block pattern and the second block pattern.

18. The electronic pen sensing device of claim 17, wherein the controller comprises:
a first switching unit configured to select the one of the first block pattern and the second block pattern and to electrically connect the selected one of the first block pattern and the second block pattern to the first node; and
a second switching unit configured to electrically connect the selected one of the first block pattern and the second block pattern to the second node.

19. The electronic pen sensing device of claim 17, wherein a first partial pattern of the first block pattern overlaps the second block pattern, and
wherein the controller comprises a fifth switch unit configured to electrically connect the first partial pattern of the first block pattern to one of the first node and the second node.

20. A display device comprising:
an electronic pen configured to generate an electromagnetic force; and
an electronic pen sensing device configured to an induction current based on the electromagnetic force and sense the electronic pen based on the induction current,
wherein the electronic pen sensing device comprises:
a substrate comprising a sensing region and a first sub sensing region, the first sub sensing region having a width smaller than a width of the sensing region;
a first closed loop line comprising:
a main pattern comprising a main coil disposed along edges of the sensing region and wound N times in a first rotation direction from a first node to a second node; and
a first sub pattern comprising a first auxiliary coil disposed along edges of the first sub sensing region and wound M times in the first rotation direction from the second node to the first node; and
a controller configured to calculate a location of an electronic pen based on the induction current which is output through the first node,
wherein N and M are positive integers.

21. An electronic pen sensing panel comprising:
a substrate comprising a sensing region and a first sub sensing region, the first sub sensing region having a width smaller than a width of the sensing region;
a first closed loop line comprising:

a main coil disposed along edges of the sensing region and wound N times in a first rotation direction from a first node to a second node; and a first auxiliary coil disposed along edges of the first sub sensing region and wound M times in the first rotation direction from the second node to the first node on the substrate; and an output terminal configured to output a first induction current which is induced by the first closed loop line, the output terminal being electrically connected to the first node, wherein N and M are positive integers.

\* \* \* \* \*